United States Patent [19]

Santosusso

[11] 4,083,831
[45] Apr. 11, 1978

[54] PROCESS FOR THE PREPARATION OF GRANULAR URETHANE-UREA POLYMERS

[75] Inventor: Thomas M. Santosusso, Lancaster, Pa.

[73] Assignee: Armstrong Cork Company, Lancaster, Pa.

[21] Appl. No.: 675,532

[22] Filed: Apr. 9, 1976

[51] Int. Cl.$^2$ .............................................. C08G 18/08
[52] U.S. Cl. .................... 260/77.5 AA; 260/29.2 TN; 260/30.4 N; 260/31.4 R; 260/32.8 N; 260/33.2 R; 260/33.6 UB; 260/33.8 UB; 260/75 NH; 260/75 NK; 260/77.5 CH
[58] Field of Search .................. 260/77.5 CH, 77.5 A, 260/77.5 AA, 29.2 TN, 33.6 UB, 75 NK, 75 NH, 33.2 R, 32.8 N, 31.4 R, 33.8 UB, 30.4 N

[56] References Cited

U.S. PATENT DOCUMENTS

| | | | |
|---|---|---|---|
| 2,702,797 | 2/1955 | Rugg | 260/45.8 |
| 2,734,045 | 2/1956 | Nelson | 260/77.5 |
| 2,830,037 | 4/1958 | Carter | 260/77.5 |
| 3,213,049 | 10/1965 | Heiss | 260/77.5 AA |
| 3,402,149 | 9/1968 | Walters | 260/29.2 TN |
| 3,560,447 | 2/1971 | Bingham | 260/29.2 TN |
| 3,655,627 | 4/1972 | Hutzler et al. | 260/77.5 AM |
| 3,817,886 | 6/1974 | McGarr | 260/33.6 UB |
| 3,850,880 | 11/1974 | Hakanson et al. | 260/77.5 AA |

FOREIGN PATENT DOCUMENTS 2,252,610    5/1973    Germany.

Primary Examiner—Eugene C. Rzucidlo

[57] ABSTRACT

A suspension process is described for the preparation of an essentially linear polyurethane-urea granule comprising the steps of:

a. adding to an aqueous solution of from about 2% to about 20% by weight of a water-soluble inert suspension agent
  1. a non-aqueous solution comprising a hydrocarbon solvent, and
   a. an organic polyisocyanate,
   b. a water immiscible polyol, and
   c. a catalyst, wherein the mole fraction of said organic polyisocyanate, with respect to said organic isocyanate and diol is from about 0.5 to 1.00;

b. heating the reaction mixture of step (a) to a temperature of from about 50° to 150° C. with stirring sufficient to form a suspension and distilling a constant boiling distillate of said hydrocarbon solvent and water;

c. terminating the distillation of step (b) when substantially no hydrocarbon solvent remains in said distillate and substantially no unreacted isocyanate remains in the reaction mixture; and d. separating the solid polyurethane-urea granule formed in step (b).

8 Claims, No Drawings

PROCESS FOR THE PREPARATION OF GRANULAR URETHANE-UREA POLYMERS

BACKGROUND OF THE INVENTION

1. Field of the Invention

This invention relates to an improved process for the formation of polyurethane-ureas in a suspension polymerization medium. More particularly, it relates to a one-shot process for the preparation of an essentially linear polyurethane-urea granular solid from a diisocyanate, polyol, water reactant mixture.

2. Description of the Prior Art

The preparation of polyurethane-urea polymers is well known. Bayer et al., in the article entitled "New Types of Highly Elastic Substances, Vulcollanes," Rubber Chem. & Technol., 23, 817–818 and 824 (1950), report the formation of these polymers by the chain extension of isocyanate-terminated polyester polyurethanes with water, also see Muller et al., Ibid. 26, 494 and 502 (1953). The products from these chain extension reactions are most often obtained as solutions in organic solvents, stable aqueous dispersions or more or less unitary solid masses. Various aqueous systems of these materials are disclosed in U.S. Pat. Nos. 2,968,575; 3,148,173; 3,213,049; 3,281,397; 3,294,724; and 3,437,624. In U.S. Pat. No. 2,702,797 a mass polymerization method for the preparation of polyurethane-urea materials is disclosed which differs significantly from those methods used by Bayer et al and Muller et al. In this patent, it is disclosed that prepolymers are not necessarily used, but that all possible reactants, i.e., the polyether glycol, polyisocyanate and water, are reacted at one time. Procedures of this type are commonly called "one-shot" reactions. U.S. Pat. No. 2,734,045 also addresses itself both to water-chain extended prepolymers and to "one-shot" polyurethane-ureas by mass polymerization techniques. U.S. Pat. No. 2,830,037 reveals the formation in organic solvents of prepolymeric chains extended with urea linkages via water at room temperature so as to provide small beads of polyurethane-ureas which are substantially cured. In U.S. Pat. No. 2,871,227 similarly is disclosed the preparation of a polyurethane-urea by initial preparation of a polyurethane-urea prepolymer or a one-shot mass polymerization of the starting material with subsequent cure of the rubbery mass thus attained.

All of the above techniques have suffered from numerous disadvantages. Aside from the expense of organic solvents, the formation of polyurethane-ureas in non-aqueous or in the presence of oranic solvent solutions has heretofore resulted in large particle size products due to the solvent swelling and tackiness-induced agglomeration of the product particles. In addition, it is readily apparent that solutions or aqueous dispersions of urethane-ureas are rather costly to ship should one desire to make solutions or dispersions at one location and subsequently use them at any place a substantial distance from the point of manufacture. Heretofore, the aqueous dispersions have been coagulated by special techniques to obtain solid urethane-ureas, as disclosed for example, in U.S. Pat. No. 3,402,149. However, it is advantageous to avoid the expense and inconvenience of these additional processing steps. Also, it is very difficult and time-consuming to filter the solids from the reaction medium and to control their particle sizes. Where the urethane-ureas have been formed as more or less unitary masses of substantial size, they may be readily shipped without undue expense, but if they are to be more advantageously used in large masses, such must be broken into small particles so as to facilitate further processing. Great difficulty is experienced in trying to reduce the tacky, rubbery particles to smaller sizes, especially since the urethane-ureas often have high tear strengths and hardness. It is, therefore, highly desirable to develop a process in which small particle form urethane-ureas are easily produced and separated in a "one-shot" process.

SUMMARY OF THE INVENTION

In accordance with the present invention, it has been discovered that organic diisocyanates can be directly reacted in an aqueous medium in which water is the continuous phase with polyols while the reaction mixture is being agitated so that there is directly formed particulate, solid urethane-urea polymers. The resulting solids are in an aqueous slurry having the solid polymer particles in a form such that the particles are not readily emulsified and easily separate or settle from the reaction medium when agitation is stopped. The reaction product is thus an unstable dispersion of polymeric granules. The separation can be obtained without the necessity of performing special coagulating techniques such as by the addition of salts or acids or by freezing. Moreover, the elastomeric polymer particles are very easily separated from the aqueous reaction medium by the usual liquid-solid separation techniques, e.g., filtration, centrifugation, and the like.

DESCRIPTION OF THE PREFERRED EMBODIMENTS

A process for synthesizing solid polyurethane-urea compounds has been discovered in which diisocyanates can be directly reacted with polyols in an aqueous suspension to form hard granular uniform diameter particles of product polymer. These product polymer particles are easily separated and removed from the reaction medium. The particle size of the solid polyurethane-urea granules can easily be controlled by controllng the rate of agitation of the reaction medium as well as the nature and the amounts of the suspending agent. In general, it has been discovered that as the agitation becomes more severe and/or the action of the suspending agents more efficient, the particles of the resultant polyurethane-urea product become smaller. Thus, any desired particulate size can be obtained simply by preselecting the proper combination of stirring speed and/or suspending agent. However, the minimum conditions are those which result in a suspension of organic droplets comprising the organic isocyanate and polyol in the aqueous phase.

The relatively large, solid urethane-urea particles prepared by the process of this invention usually have a diameter, in microns, of from $5000\mu$ to about $500\mu$ and preferably the particles are about $2000\mu$ to $1000\mu$ in diameter. Smaller particles can readily be prepared as well, these usually having diameters of from $100\mu$ to $10\mu$ and preferably $70\mu$ to $50\mu$ in diameter. The size of the solid urethane-urea particles corresponds in general to the size of the droplets present in the reaction mixture when such droplets reach reaction temperature. Thus, by selection of the reaction conditions, solid urethane-urea particles of any desired size can be obtained. The resulting particles can be separated, handled and further processed with ease.

The urethane-urea solids can be formed into various shapes, preferably after drying, and with or without dissolution in an organic solvent. Thus, the thermoplastic solids can be directly cast into films through the action of heat and/or pressure or by solvent casting techniques. The solids may also be made into fibers, coatings or other desirable forms. The urethane-urea polymers made from aliphatic reactants exhibit excellent resistance to yellowing under the influence of ultraviolet light.

An essential component used in making the polymer compositions of this invention are one or more polyols, such being essentially immiscible with water. Polyol-watr immiscibility is particularly important in the one-shot systems of this invention since dilution of the reacting polyol by solubilization in the aqueous medium favors the water-isocyanate reaction and, therefore, an overabundance of urea groups in the final polymer product and a concurrent deterioration of product physical properties. Further, if the viscosity of the polyol is not sufficiently low so as to be capable of suspension in water during agitation of the reaction mass, then such polyols should be soluble in an inert hydrocarbon solvent, whose principal use is to reduce the viscosity of the reacting polyol and allow it to become easily suspended during the agitation. The polyols useful in this invention can be aliphatic, cycloaliphatic, aromatic or mixed structures thereof. The polyols preferred contain a major amount of aliphatic diol, although triols or other polyols having greater than three hydroxyl groups as well as their mixtures with diols can be employed. The polyols having at least two hydroxyl groups, preferably for the most part attached to aliphatic carbon atoms, and selected from a wide variety of polyhydroxyl materials are most useful in this invention. Aside from the hydroxy groups, the structure of the polyol is usually hydrocarbon in nature, but the polyols can be further substituted. The polyols may often have an average molecular weight of up to 5,000 or more, but preferably have a molecular weight of from about 500 to 1000.

Suitable aliphatic alcohols referred to above include those essentially water-insoluble polyether glycols of up to about 5,000 or more molecular weight, such as polyoxyethylene glycol, polyoxypropylene glycol, and polyoxybutylene glycol. The latter materials include those straight chain polyoxybutylene glycols often referred to as polytetramethylene ether glycols, as well as the branched chain polyoxybutylene glycols, for instance, made from 1,2- and 2,3-butylene oxides.

Other polyols useful in this invention include the hydroxy esters such as caster oil, polyol-modified caster oils, other polyol-modified fatty oils and hydroxy-terminated polyesters. Hydroxy-terminated polyester materials are generally made by the reaction of one or more polyhydroxy materials, such as the aliphatic polyols mentioned above, with one or more aliphatic, cycloaliphatic, or aromatic polycarboxylic acids or esters, and such polyesters can often have hydroxyl values in the range of from about 25 to 150. Frequently in polyesters of this type, the polyhydroxy alcohols are predominantly diols and the acids are dicarboxylic acids, including their anhydrides, and preferably containing from about 4 to 50 carbon atoms, e.g., phthalic acid, adipic acid, sebacic acid, dimers of olefinically-unsaturated monocarboxylic acids, such as linoleic acid dimer and so forth. Modified castor oil partial esters can be made by ester interchange of the oils with polyols such as low molecular weight polyols, including glycols, glycerine, pentaerythritol, and so forth.

There is a greater tendency to produce intractable polymer gels when the polyol contains a cross-linking component which has at least three hydroxyl groups per molecule. The polyol reactants include those in which at least a portion of such reactants have at least three hydroxy groups per molecule such as those mentioned before, and the alkylene-oxide derived polyethers. However, the amount or degree of functionality of the polyol should not be so great that an intractable polymer is obtained as the granular product. Such cross-linking aliphatic polyols often have from about 3 to 12, preferably from about 3 to 6, carbon atoms. When the polyol component used in making the urethane-urea polymers contains cross-linking polyols, essentially the entire polyol may have at least about three hydroxy groups per molecule. Large amounts of such polyol or polyols of high functionality may preclude the formation of elastomers, therefore, it may be desirable to limit the hydroxy groups applied in the cross-linking polyol to up to about 30, preferably up to about 10, mole percent based on the total hydroxy group content. Polyhydric polythioether polyols may also be used in this invention. These, for example, result from the condensation product of a thiodiglycol or the reaction product of a dihydric alcohol, such as disclosed above in the preparation of hydroxy-terminated polyesters with any other suitable thioether glycol.

The hydroxy-terminated polyester may also be a polyester amide such as is obtained by including some amine or amino alcohol as a reactant in the preparation of the polyesters. Thus, polyester amides may be obtained by condensing an amino alcohol such as ethanolamine with the polycarboxylic acids set forth above. It may also be made using the same components that make up the hydroxy-terminated polyesters with only a portion of the components being a diamine, such as ethylene diamine.

Alkylene oxide adducts of acids of phosphorus may also be used as the polyol component in this invention. These include those neutral adducts prepared from the alkylene oxide materials disclosed above for the use in the preparation of polyalkylene ether polyols. Acids of phosphorus which may be used are acids having a $P_2O_5$ equivalency of from about 72% to about 95%. The phosphoric acids are preferred.

Any suitable hydroxy-terminated polyacetal may also be used such as, for example, the reaction product of formaldehyde or other suitable aldehydes with dihydric alcohol or an alkylene oxide such as those disclosed above.

Although the use of an organic diisocyanate is essential in the preparation of the urethane-urea polymers of this invention, minor amounts of other polyisocyanates can be employed, providing compositions are not unduly deleteriously affected. In making the urethane-urea polymers, one or more of a variety of hydrocarbon diisocyanates can be reacted. Thus, the diisocyanate may be aliphatic, aromatic or mixed aliphatic-aromatic structures. The aliphatic and cycloaliphatic diisocyanates are preferred, especially when making urethane-ureas exhibiting good resistance to the yellowing effects of ultraviolet light. The isocyanates can be substituted with non-interfering groups such as aliphatic hydrocarbon radicals, e.g., lower alkyl or other groups having no active hydrogen as determined by the Zerewitinoff test, J. Am. Chem. Soc., 49, 3181 (1927). The diisocyanate often has at least about 6 carbon atoms and usually does not have more than about 40 carbon atoms. Diisocyanates of about 8 to 20 carbon atoms in the hydrocarbon group are preferred. Suitable diisocyanates include di-(isocyanato cyclohexyl) methane, 1-isocyanato-3-isocyanatomethyl-3,5,5-trimethyl cyclohexane, hexamethylene diisocyanate, methylcyclohexyl diisocyanate, 2,4,4-trimethylhexamethylene diisocyanate, 2,6-tolylene diisocyanate, 2,4-tolulene diisocyanate, p-phenylene diisocyanate, p,p'-diphenylmethane diisocyanate, 1,5-napthalene diisocyanate, etc. The use of alphatic diisocyanates, especially di-(isocyanato cyclohexyl) methane, is preferred since the aromatic diisocyanates usually lower the resistance of the urethane-urea polymers to the effects of ultraviolet light.

The polyurethane-type polymer products of this invention can be made by simultaneous reaction of the organic polyisocyanate and polyol. Alternatively, the isocyanate can be reacted with part or all of one or more of the polyols prior to the reaction with the remaining portion of these materials. It is possible, however, to conduct the polymerization in the absence of any organic solvent providing, however, that all reactants are of sufficiently low viscosity to easily form into a suspension during reaction. In this case, the distillate removed from the reacting mass is substantially water. Times of reaction are from 1 to 4 hours.

The reaction temperatures for making the various urethane-urea polymers of the present invention are essentially controlled by the temperature at which the substantially inert hydrocarbon solvent and water form a constant boiling mixture, such being about 50° to 150° C., preferably 80° to 100° C. It should be noted that the organic solvent not only functions to insure that all the reactants react at the temperature of the constant boiling mixture, thereby insuring a reproducible reactant time and product quality but it is also useful to place all reactants in a liquid state of sufficiently low viscosity so that easy suspension occurs during agitation. Various solvents which do not contain a reactive hydrogen can be employed and among the useful organic solvents are aromatic hydrocarbons, ethers, ketones, glycol-ether-esters, chlorinated hydrocarbons, hydrogenated furans, and the like, and mixtures thereof. The amount of organic solvent employed, if any, can vary widely, but large amounts may be uneconomic or give materials with undesirably or inconveniently low viscosity. It is particularly important that all solvent be removed during the reaction period by distillation, e.g., that there be a large excess of water. When water-solvent ratios are near to unity, disadvantageous particle agglomeration readily occurs and the fine particulate matter resulting from this invention is not obtained. Often about 10 to 70 weight percent of solvent, preferably about 40 to 60 weight percent of solvent by weight of isocyanate-polyol in the reactant solution can be used. Among the preferable normally liquid solvents are toluene, xylene, ethylbenzene, 1,1,1-trichloroethane, methyl isobutyl ketone, etc., and mixtures thereof. It is preferred that the solvent not contain more than about 10 carbon atoms per molecule and that such solvent form a constant boiling mixture with water.

Catalysts must be used in forming the prepolymer of this invention so as to accelerate the rate of reaction. Typically, the catalysts that find particular use in this invention are the organotin compounds, for example dibutyl tin dilaurate, stannous octoate, or mixtures thereof. Particularly to be avoided are the catalysts that favor the water-isocyanate reaction over that of the polyol-isocyanate reaction, these being tertiary aliphatic and alicyclic amines, such as triethyl amine, triethanol amine, tri-n-butylamine, triethylene diamine, alkyl morpholines and the like.

In order to improve the suspending action and concurrently give a more uniform particle size product, it is useful, but not necessary, to add to the aqueous system a surface activator. These activators should be used in amounts small enough so that they themselves do not act as suspension agents (e.g., so that amulsions or latexes form). Suitable surface activators are sodium lauryl sulfates and sodium alkyl sulfonates.

As stated above, the urethane-urea compositions of this invention are prepared by reacting the diisocyanate and polyol in the presence or absence of a solvent to obtain the particulate solids, the reaction being conducted in the liquid phase with water serving as the continuous reaction phase. To facilitate the suspension of the reactant material, any suitable inert-soluble suspension agents must be used. These suspension agents are suscinctly described in *Polymer Processes*, C. Schildknecht, pp. 69–109, and include polyvinylpyrrolidone, polyacrylic acid salts, various water-soluble rubbers and the like. Polyvinylpyrrolidone is particularly useful in aiding in the maintenance of a stable suspension during the polymerization reaction. These water-soluble suspending agents are advantageously present in the aqueous phase from about 0.1 to about 40% by weight. Preferred concentrations of such suspending agents in the aqueous solution are from about 2 to 20% by weight. Most preferred is from about 2 to 5 percent by weight. The reactants are dispersed in the aqueous phase by, for instance, any suitable means of agitation or dispersing procedure. In order to achieve the smaller particle size products, it is preferred to conduct a preliminary agitation of the reaction/reactant mass by agitation in a high-speed agitator such as a Waring blender or high shear agitator such as a Sonolator sonic agitator. After such agitation, the suspension is transferred to a reaction flask where heating to the reaction temperature and stirring with a mechanical (lower speed) stirrer is carried out. Stirring rates up to about 2500 rpm have been found sufficient to maintain the suspension after initial high-shear agitation. For large particle size products, this initial agitation step may be omitted. Most preferred are stirring rates from 100 to 500 rpm. Elevated pressures may also be used to effect reaction of the components. In such cases, the higher temperatures can be avoided. The reaction can be for a period of only a few minutes or up to several days, but normally is from 1 to 4 hours. Generally it is desirable to continue the reaction until a good yield of solids is obtained. Various ways of combining the reactants can be used providing gelling of the reaction mixture is avoided. It is preferred that the polyol not be in excess in the presence of the diisocyanate. It is preferable that the mole ratio of organic polyisocyanate to organic polyisocyanate and polyol not be less than 0.5 and may be as great as 1.00. Excess polyol, however, can be used if hydroxy-terminated polyurethane-urea polymers are desired. Generally, contact of the reactants with water at temperatures of less than 50° is restricted in order not to evoke undue reaction times. The amount of water serving as the continuous phase is often from about 20 to 1.5 volumes per volume of reactant liquid, preferably about 5 to 1.5 volumes per volume of reactant liquid. In any event, the amount of water is sufficient to form the continuous reaction phase and excessively large amounts of water should be avoided since they may give rise to unnecessary handling expense.

The amount of polyol and diisocyanate reacted and the reaction conditions are chosen so that substantially all of the isocyanate content is reacted on a weight basis. Since a stoichiometric equivalent or excess of polyol plus water is present in the reaction suspension, the free isocyanate content of the urethane-urea polymer is usually less than about 1% based on polymer solids, and often the free isocyanate content is less than about 0.5%. The urethane-urea polymer obtained in the aqueous system is essentially non-cellular and this is distinguished from a foam.

The urethane-ureas of this invention can be employed in any way desired to take advantage of the characteristics of the products, for instance, the urethane-ureas may be used as coatings, adhesives, laminants or flocculants or formed into relatively thick sheets or other film-like materials. Due to the elastomeric properties of the products, they may be applied and employed in a manner to take advantage of such characteristics. The film-type products generally have a thickness of up to about 100 mils or more and often the coating compositions have a thickness of up to about 10 mils. The urethane-ureas can be formed into various materials or articles of greater cross-sectional dimensions, and can be employed in the various ways known in the art for utilization of these types of materials. The compositions can contain additives to impart special properties such as plasticizers, pigments, fillers, and the like. Also, the solid substrates bearing the coatings may be specially -treated materials, including flammable members impregnated with fire-resistant chemicals or coated with sealants.

The scope of the invention is readily understood by referring to the following examples which are given for illustrative purposes only and should not be considered to represent the limits of this invention.

EXAMPLE 1

This example describes a one-shot process for the preparation of a small particulate polyurethane-urea derived from di-(isocyanato cyclohexyl) methane and a polyester diol.

To a 1 gallon blender was added water (1033 g.) aqueous polyvinyl pyrrolidone solution (GAF type K60 PVP, 45% in water; 122 g., about 5% of the aqueous phase) and sodium lauryl sulfate (0.11 g., about 0.01% of the aqueous phase). A freshly prepared solution of a polycaprolactone diol (Union Carbide's Niax PCP0200; eq. wt. 263.5; 33.0 g., 0.125 equivs.), bis(4-isocyanatocyclohexyl)methane (duPont's Hylene W, a mixture of stereoisomers; 32.8 g., 0.250 equivs.), stannous octoate (M&T's T-9; 0.33 g., 0.5% on solids) and dibutyltin dilaurate (Metal and Thermite's T-12; 0.33 g., 0.5% on solids) in toluene (154 g. to make a 30% solution) was added all at once with rapid stirring in a Waring blender (NCO/OH = 2.0). The agitation in the blender was continued for about 5 minutes. The resulting suspension was then transferred to a 2 l. creased flask equipped with paddle stirrer, thermometer, condenser and Dean-Stark trap. The suspension was maintained by stirring at moderate speed (ca. 200 rpm) while the temperature of the reaction mixture was raised to 50° C. This temperature was maintained for 1 hour and then, with continued stirring, was raised to 75° C. and maintained there for 2 hours. The temperature was then raised to 86° C. to distil out the toluene-water azeotrope. After this time no unreacted isocyanate could be detected (by infrared). When the azeotropic distillation was complete (ca. 1 hour), the suspension was cooled, filtered, washed with water and air dried. The resulting polyurethane-urea took the form of a fine powder with a median particle size of approximately 100μ; characterized by Tg = −27° C.; Mn 2.21 × $10^4$; M$_z$ =9.31 × $10^4$.

EXAMPLE 2

The experiment described in Example 1 was repeated except that less T-12 (0.2%) and less polyvinylpyrrolidone (2.5%) were used and the sodium lauryl sulfate was omitted. This resulted in the formation of polyurethane-urea beads with median particle size between 800μ and 1600μ.

EXAMPLE 3

To a 1 gallon blender was added water (1 l.) and Cabopol 941 (a B. F. Goodrich Chemical thickener described as a polyacid; 2.00 g.). Sodium hydroxide (10 g. of a 10% aqueous solution; brings pH to 9.0) was then added. A freshly prepared solution of PCP0200 (132 g., 0.500 equiv.), Hylene W (65.6 g., 0.500 equiv.) and stannous octoate (0.99 g., 0.5% of solids) in toluene (198 g. to make a 50% solution) was added all at once with rapid stirring (NCO/OH = 1.00). The mixture was stirred for several minutes and the resulting suspension transferred to a stirred reaction flask as in Example 1. While stirring to maintain the suspension, the temperature was raised to 87° C. and the toluene-water azeotrope distilled out. The mixture was held at 95° C. for an additional hour with continued stirring, after which no unreacted isocyanate could be detected (infrared). The hot suspension was then poured into a moderately agitated blender containing water (1 l.), ice (2 l.) and concentrated hydrochloric acid (3 g.). The mixture was stirred for 5 minutes after which the neutral suspension (ph = 7) was filtered, washed with additional water and air dried. This gave a finely divided polymer powder with a medium particle size of approximately 100μ; Tg = −53° C.

EXAMPLE 4

The experiment described in Example 3 was repeated except that the diol used was a polyhexamelthylene isophthalate (Hooker's S1030-115, equiv. wt. 509), the NCO/OH was 1.70, and the catalyst used was a mixture of stannous octoate (0.5%) and dibutyltin bis(lauryl mercaptane) (M&T's 0.05%). This resulted in a polyurethane-urea powder with a median particle size between 70μ and 90μ; Tg = 12° C.

It will be apparent that many widely different embodiments of this invention may be made without departing from the spirit and the scope thereof and, therefore, it is not intended to be limited except as indicated in the appended claims.

What is claimed is:

1. A suspension process for the preparation of essentially linear polyurethane-urea granules comprising the steps of:
   a. adding to a water solution of from about 2% to about 20% by weight of a water-soluble inert suspending agent
      1. a solution comprising an organic solvent which does not contain a reactive hydrogen, and a. an organic diisocyanate selected from the group consisting of cycloaliphatic diisocyanate, aliphatic diisocyanate and aromatic diisocyanate,
b. a water immiscible polyol comprising not more than up to about 30 mole percent based on total hydroxy group content of a crosslinking component which has at least three hydroxyl groups per molecule.
c. a catalyst not favoring the water-isocyanate reaction over the polyol-isocyanate reaction, wherein the mole fraction of said organic diisocyanate with respect to said organic diisocyanate and polyol is from about 0.5 to about 1.00 and the amount of water is sufficient to form the continuous reaction phase;

b. heating the reaction mixture of step (a) to a temperature of from about 50° to 150° C. with stirring sufficient to form a suspension and distilling a constant boiling distillate of said organic solvent and water;

c. terminating the distillation of step (b) when substantially no organic solvent remains in said distillate and substantially no unreacted isocyanate remains in the reaction mixture; and d. separating the solid polyurethane-urea granules formed in step (b).

2. The process of claim 1 wherein the mixture of step (a) is initially agitated in a high speed agitator.

3. The process of claim 2 wherein said suspending agent is polyvinylpyrrolidone in said aqueous solution at 2–5% by weight.

4. The process of claim 3 wherein a surface activating agent is added to said aqueous solution.

5. The process of claim 1 wherein said water immiscible polyol has a molecular weight of 500–1000 and is selected from the group consisting of polyalkylene ether glycol and hydroxy-terminated polyester.

6. The process of claim 4 wherein said solid polyurethane-urea granules are obtained in diameters of from 10–150 microns.

7. The process of claim 1 wherein said solid polyurethane-urea granules are obtained in diameters of from 500–5000 microns.

8. The process of claim 4 wherein said organic solvent is xylene, and step (b) is carried out at a temperature of 86°–100° C.

* * * * *